United States Patent
Pothula et al.

(10) Patent No.: US 12,405,908 B2
(45) Date of Patent: Sep. 2, 2025

(54) ACCESSING NETWORK CHIP RESOURCES

(71) Applicant: Arista Networks, Inc., Santa Clara, CA (US)

(72) Inventors: Lakshmikantha Chowdary Pothula, Santa Clara, CA (US); Christopher Patrick Hayden, Hollis, NH (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 18/160,792

(22) Filed: Jan. 27, 2023

(65) Prior Publication Data

US 2024/0256476 A1     Aug. 1, 2024

(51) Int. Cl.
    *G06F 13/28*     (2006.01)
    *G06F 3/06*      (2006.01)
    *G06F 9/54*      (2006.01)

(52) U.S. Cl.
    CPC ............. *G06F 13/28* (2013.01); *G06F 9/54* (2013.01); *G06F 2213/28* (2013.01)

(58) Field of Classification Search
    CPC ................. H04L 67/1097; H04L 69/163
    See application file for complete search history.

(56) References Cited

U.S. PATENT DOCUMENTS

| | | | | |
|---|---|---|---|---|
| 2001/0021949 A1* | 9/2001 | Blightman | ............ | H04L 69/163 370/254 |
| 2004/0015723 A1* | 1/2004 | Pham | ............ | H04L 63/10 709/217 |
| 2004/0015724 A1* | 1/2004 | Pham | ............ | H04L 63/12 713/181 |
| 2006/0004879 A1* | 1/2006 | Tone | ............ | G06F 11/2097 |
| 2006/0155831 A1* | 7/2006 | Chandrasekaran | ............ | H04L 67/1097 709/223 |
| 2018/0270162 A1* | 9/2018 | Prabhakar | ............ | H04L 49/254 |

* cited by examiner

*Primary Examiner* — Getente A Yimer
(74) *Attorney, Agent, or Firm* — Treyz Law Group, P.C.; Tianyi He

(57) ABSTRACT

A data processing system can include a first processor, a second processor, and one or more data storage resources each configured to store data for processing network traffic. The second processor can help the first processor perform direct memory access (DMA) operations to write the data into the one or more data storage resources using DMA channels. DMA channels may be allocated between the data storage resources based on the allocation of data for storage on different data storage resources.

18 Claims, 6 Drawing Sheets

ACCESSING NETWORK CHIP RESOURCES

BACKGROUND

A communication system includes multiple network devices that are interconnected to form a network for conveying network traffic between network devices. A network device can occasionally receive updates during which data for handling network traffic is written to the network device. When the network device is receiving these updates, the processing of network traffic through the network device can be paused, thereby creating a blackout time period which can occur during an upgrade of network device software. A lengthy blackout time period can undesirably impact network performance.

DETAILED DESCRIPTION

A network device such as a packet switching device may include different data storage resources (e.g., data structures such as tables, lists, arrays, buffers, queues, rings, etc.) to which corresponding types of network data are written. One or more processors such as a coprocessor may receive commands from one or more other processors such as a host processor (e.g., a central processing unit) for performing direct memory access (DMA) to write the network data into the different data storage resources. Since the writing of network data into the network device is often associated with an undesirable blackout time period during which the network device is not processing network traffic, it may be desirable to accelerate the writing of the network data into the different data storage resources of the network device, thereby limiting the duration of the blackout time period. In particular, the writing of network data into the network device may occur during software updates (e.g., upgrades). It may be desirable to shorten the duration of downloading and installing tables (e.g., forwarding tables, routing tables, and/or other networking data tables) and/or other network data into network device data storage structures to reduce the duration of the blackout time period The host processor, coprocessor, and the network device in general may be configured in a number of different ways to accelerate the writing of the network data into the different resources. As examples, the host processor may coalesce commands before sending them to the coprocessor, the coprocessor may allocate multiple DMA channels to a particular data storage resource, the coprocessor may perform an initial DMA channel allocation and/or dynamically re-balance DMA channels across the data storage resources based on a priori and/or observed information, the coprocessor may implement multiple command queues specific to different data storage resources, and the coprocessor may buffer commands from the host processor onto one or more command queues while one or more other command queues are processed to perform DMA operations. In general, any combination of these examples (e.g., combinations that omit one or more of these examples) may be implemented in a data processing system such as data processing system 10 in FIG. 1 to accelerate the writing of network data into the different data storage resources of the network device.

Figure 1:
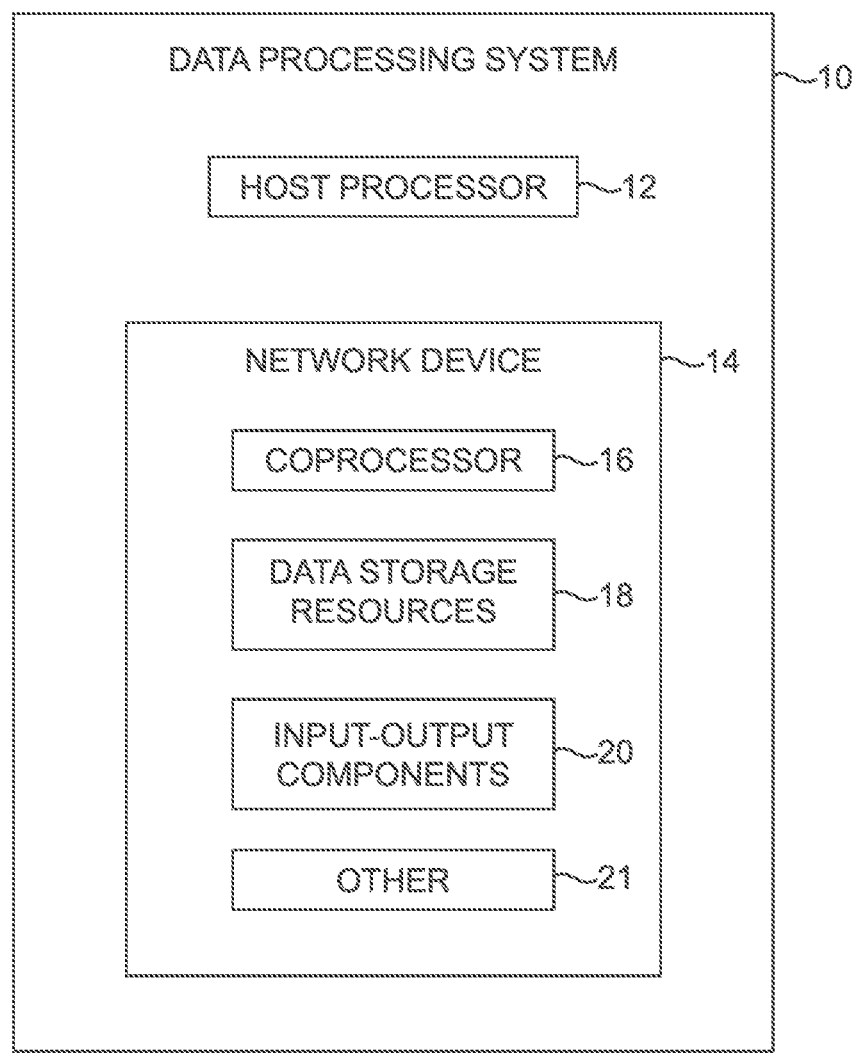
FIG. 1 is a diagram of an illustrative network system having a host processor and a coprocessor in accordance with some embodiments.

FIG. 1 is a schematic block diagram of an illustrative data processing system 10. In the example of FIG. 1, data processing system 10 includes processing circuitry (e.g., one or more processors) that implements a host processor 12 (sometimes referred to as central processing unit 12) and one or more network devices such as network device 14. Data processing system 10 may sometimes be referred to herein as a host device or host system. Network device 14 may include processing circuitry (e.g., one or more processors) that implements a coprocessor 16, data storage resources 18, input-output components 20, and other components. Host processor 12 in system 10 may be used to control the operation of one or more network devices 14 (e.g., each having its own coprocessor 16, data storage resources, ports, etc.). In some scenarios in which host processor 12 is used to control the operation of a single network device, system 10 may effectively function as and therefore be referred to sometimes as a network device (e.g., network device 10 containing host processor 12, coprocessor 16, resources 18, and input-output components 20).

System 10 may be part of a digital system or a hybrid system that includes both digital and analog subsystems. System 10 may be used in a wide variety of applications as part of a larger computing system, which may include but is not limited to: a datacenter, a computer networking system, a data networking system, a digital signal processing system, a graphics processing system, a video processing system, a computer vision processing system, a cellular base station, a virtual reality or augmented reality system, a network functions virtualization platform, an artificial neural network, an autonomous driving system, a combination of at least some of these systems, and/or other suitable types of computing systems.

Network device 14 may be a switch, a router, a bridge, a hub, a repeater, a firewall, a device serving other networking functions, a device that includes a combination of these functions, or other types of network elements. Configurations in which network device 14 forms a network switch device such as an Ethernet network switch or Ethernet line card are sometimes described herein as an illustrative example. In particular, configured in this manner, network device 14 may perform packet switching by receiving, processing and forwarding data with other devices (e.g., on a local area network). To perform these packet switching functions, network device 14 may support any suitable protocol(s) such as spanning tree protocol (STP), Multiple Spanning Tree Protocol (MSTP), Rapid Spanning Tree Protocol (RSTP), Link Aggregation and Multiple MAC Registration Protocol, Shortest Path Bridging (SPB), etc.

As shown in FIG. 1, system 10 may include processing circuitry such as host processor 12 and one or more coprocessors 16 in corresponding network devices 14. In general, host processor 12 and coprocessor 16 may each represent processing circuitry based on one or more microprocessors, graphics processing units (GPUs), general-purpose processors, microcontrollers, digital signal processors, application specific integrated circuits (ASICs), application specific system processors (ASSPs), programmable logic devices such as field-programmable gate arrays (FPGAs), a combination of these processors, or other types of processors.

Host processor 12 and/or coprocessor 16 may each be used to run a network system/device operating system and/or other software/firmware that is stored on corresponding memory (e.g., memory for host processor 12 and separate and/or shared memory for coprocessor 16). The memory may include non-transitory (tangible) computer readable storage media that stores the operating system and/or any software code, sometimes referred to as program instructions, software, data, instructions, or code. The memory may include nonvolatile memory (e.g., flash memory or other electrically-programmable read-only memory configured to form a solid-state drive), volatile memory (e.g., static or dynamic random-access memory, cache memory), hard disk drive storage, and/or other storage circuitry.

To optionally couple to external input and/or output devices (e.g., other network devices or systems, end hosts, etc.), network device 14 may include input-output components 20. As examples, input-output components 20 may include communication interface components such as a Bluetooth® interface, a Wi-Fi® interface, an Ethernet interface (e.g., one or more Ethernet ports), an optical interface, and/or other networking interfaces for connecting device 14 to the Internet, a local area network, a wide area network, a mobile network, other types of networks, and/or to another network device, peripheral devices, and/or other electronic components.

If desired, network device 14 may include other components 21 such as a system bus that couples the components of network device 14 to one another. If desired, the same system bus and/or a different system bus may couple components within network device 14 to components external to network device 14 such as host processor 12.

Network device 14 may generally receive, process, and forward network traffic. To do so, network device 14 may include different packet processing modules such as one or more ingress modules (each containing a corresponding ingress processing pipeline), one or more memory management modules (each containing a corresponding processing pipeline), one or more egress modules (each containing a corresponding egress processing pipeline) that sequentially process any received network packets, thereby forming the data plane of network device 14. Each processing pipeline may perform functions such as VLAN (virtual Local Area Network) membership lookup, spanning tree membership lookup, forwarding lookup, general pattern matching, quality-of-service (QoS) lookup, etc. Each of these functions may entail matching data from a network packet to stored data on a corresponding data storage resource 18 (e.g., one or more data structures such as tables, lists, arrays, buffers, queues, rings, etc.).

Configurations in which network device 14 includes at least three types of data storage resources 18 are sometimes described herein as an illustrative example. In this example, network device 14 may include a first data storage resource 18 for ingress modules that contains one or more tables (e.g., a VLAN membership table, a spanning tree membership table, one or more pattern matching tables), a second data storage resource 18 for egress modules that contains one or more tables (e.g., a VLAN membership table, a spanning tree membership table, one or more pattern matching tables), and a third data storage resource 18 for memory management modules that contains one or more tables (e.g., a QoS table). These types of data are sometimes referred to herein as network traffic processor data.

While each data storage resource 18 is described to contain one or more tables, in some illustrative configurations, this may refer to a primary data storage resource (e.g., data storage resource 18 such as a buffer, a circular buffer or ring, or other data structure) to which sub-resources such as the one or more tables are mapped. As such, the primary data storage resource and the sub-resources both form data storage resources. In this case, one or more command queues are maintained per primary data storage resource.

Accordingly, to provide network device 14 with the desired functionality over time, data stored on the different data storage resources 18 may be updated. In other words, the desired network data (e.g., VLAN membership data, spanning tree membership data, pattern matching data, QoS data, etc.) may be written into network device 14 during these updates. However, these updates are typically associated with an undesirable blackout time period during which network device 14 is not processing network traffic. As such, it may be desirable to accelerate the writing of the network data into different data storage resources 18 of network device 14, thereby limiting the duration of the blackout time period.

Figure 2:
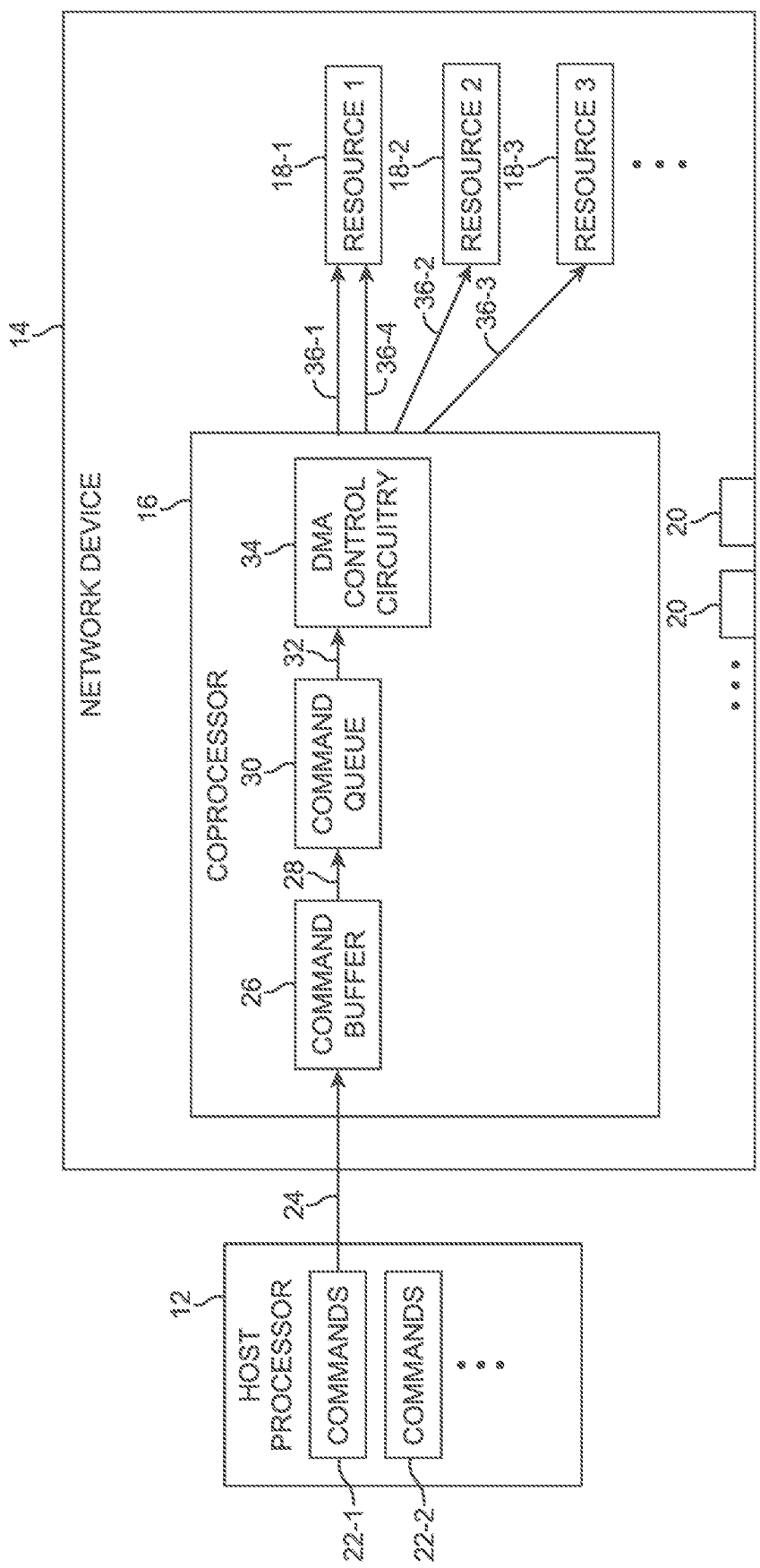
FIG. 2 is a diagram of an illustrative network device configured to provide multiple direct memory access (DMA) channels for a target resource in accordance with some embodiments.

FIG. 2 is a diagram of an illustrative data processing system having a network device coprocessor operating in conjunction with a host processor to perform direct memory access (DMA) when writing the network data into different data storage resources. As shown in FIG. 2, host processor 12 may include a number of command storage structures 22 such as buffers and/or queues for storing commands such as DMA commands. As an example, command storage structure 22-1 may store a first set of commands (e.g., caused by a first set of agents or processes running on host processor 12) and command storage structure 22-2 may store a second set of commands (e.g., caused by a second set of agents or processes running on host processor 12). Host processor 12 may generally include any number of command storage structures 22.

To enable offloading of these (DMA) commands from the host processor 12 to coprocessor 16, coprocessor 16 may include (implement) a command buffer 26, a command queue 30, and DMA control circuitry 34 (sometimes referred to as DMA controller 34). In particular, command buffer 26 may receive (a copy of) at least a subset of commands from command data structure 22-1 via path 24 (e.g., a processor-to-processor bus, an I2C bus, a PCIe bus, etc.).

Coprocessor 16 may sequentially validate the commands on command buffer 26 before sequentially queuing the commands onto command queue 30 via path 28. Commands on command queue 30 may be sequentially dequeued via path 32 to start the corresponding DMA operation based on the dequeued command. In particular, DMA control circuitry 34, responsive to the receive DMA command may use one or more DMA channels 36 to write data into the corresponding data storage resource 18 (e.g., data storage resources 18-1, 18-2, 18-3, etc.).

In particular, in implementing the DMA channels, coprocessor 16 (e.g., DMA control circuitry 34) may connect each DMA channel to a corresponding destination interface (e.g., at one of the data storage resources 18). To further accelerate the DMA operation, coprocessor 16 (e.g., DMA control circuitry 34) may provide multiple DMA channels 36 that access the same data storage resource 18 via corresponding destination interfaces. This may increase the throughput of data transfer for the particular data storage resource 18 (e.g., by prioritizing a high number of DMA channels for data storage resource 18 with the largest number of tables and/or largest amount of data to be written into).

In the example of FIG. 2, DMA control circuitry 34 may implement DMA channels 36-1 and 36-4 that are both connected to (e.g., have destination interfaces with) data storage resource 18-1. In particular, DMA control circuitry 34 may include separate DMA control circuits that each control the operation and/or input-output connections (source and destination) interfaces of a corresponding DMA channel.

Each given data storage resource 18 (e.g., resource 18-1) may include multiple tables to which data can be written into. If desired, the multiple DMA channels may have destination interfaces connected to different tables (e.g., storage structures for the different tables) in the same data storage resource 18-1 or may be connected to different parts of the same table, as examples.

In practice, network device 14 (e.g., coprocessor 16) may include a limited number of DMA channels for use (e.g., four DMA channels 36 in the example of FIG. 2). Accordingly, Coprocessor 16 may allocate certain data storage resource(s) 18 with multiple DMA channels 36 while allocating fewer DMA channels 36 to other data storage resource(s). This type of allocation may generally be based on the expected amount of data to be written and/or the observed amount of data being written into each data storage resource 18.

Referring to the allocation of DMA channels 36 in FIG. 2 as an example, coprocessor 16 may, based on expected and/or observed data allocation across data storage resources 18, determine that data storage resource 18-1 is expected to store more data than both resource 18-2 and resource 18-3. With a limit of four DMA channel for allocation, coprocessor 16 may allocate each one of the three resources 18 with one DMA channel to enable DMA operation to write onto each of the three resources 18-1, 18-2, and 18-3 and may allocate the last of the four DMA channels 36-4 to resource 18-1 to accelerate DMA operations (e.g., DMA commands), which is expected to occur more frequently for resource 18-1 than resources 18-2 and 18-3.

As described above, command buffer 26 may copy commands from command storage structure 22-1 in batches at a time. When command storage structure 22-1 is empty and there are no more commands to copy onto command buffer 26, command buffer 26 may begin copying commands from a different command storage structure such as command storage structure 22-2. However, this process of determining that command storage structure 22-1 is empty and/or providing a connection to a different command storage structure 22-2 (and perhaps repeating this process if command storage structure 22-2 is also empty and so on) may delay the population of commands onto the command processing pipeline (e.g., buffer 26, queue 30, etc.) in coprocessor 16. To mitigate this issue, a separate data structure for coalescing commands may be implemented.

Figure 3:
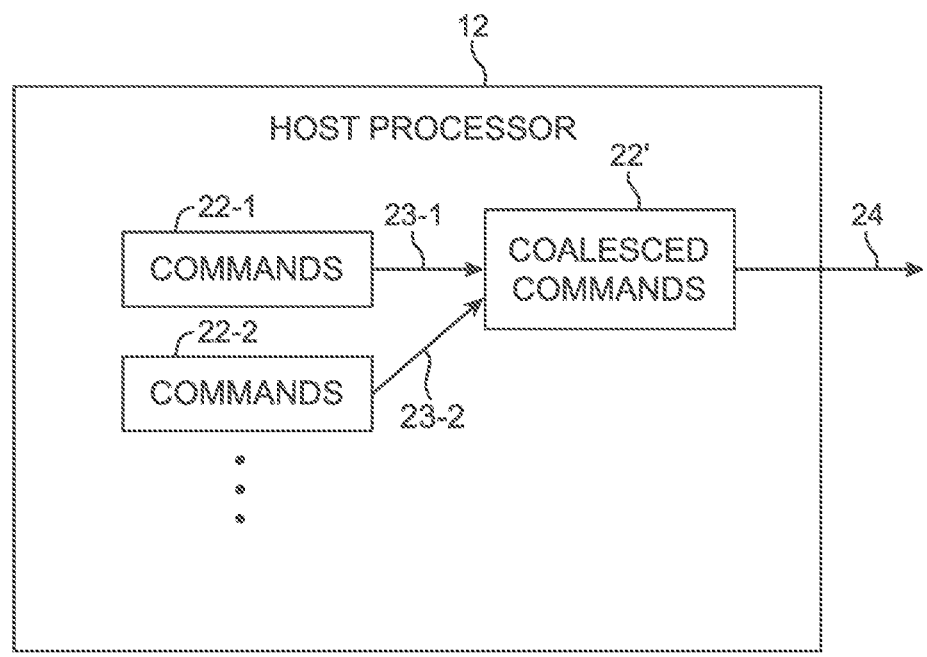
FIG. 3 is a diagram of an illustrative host processor having a storage structure for coalesced commands from multiple sources in accordance with some embodiments.

FIG. 3 is a diagram of an illustrative host processor that includes a dedicated (command) storage structure 22' such as a buffer, a queue, a ring, etc. separate from command storage structures 22-1, 22-2, etc. storing the separate commands. Command storage structure 22' may aggregate or coalesce all the commands received from the separate command storage structures 22-1, 22-2, etc., for storage. Coalescing storage structure 22' may receive commands from storage structure 22-1 via path 23-1, may receive commands from storage structure 22-2 via path 23-2, etc. In particular, whereas command storage structure 22-1, 22-2, etc., each store commands from a different set of host agents or processes executing on host processor 12, coalescing storage structure 22' may store (copies of) commands from all of these sets of host agents or processes.

Configured in this manner, command storage structure 22', instead of any single command storage structure 22-1, 22-2, etc., may output (copies of) the aggregated commands via path 24 to coprocessor 16 (e.g., command buffer 26) in batches. Because command storage structure 22' will typically not be empty unless each of the separate command storage structure 22-1, 22-2, etc. are all empty, command buffer 26 may not need to switch connections to different command storage structures (e.g., between storage structures 22-1 and 22-2) and will remain populated without significant delay (e.g., attributable to this connection switching operation). Additionally, providing command storage structure 22' that stores aggregated or coalesced commands can further help alleviate these types of (empty pipeline) delays, which would be more common when multiple command queues (or command pipelines) are provided on coprocessor 16 to accelerate processing of these commands.

Figure 4:
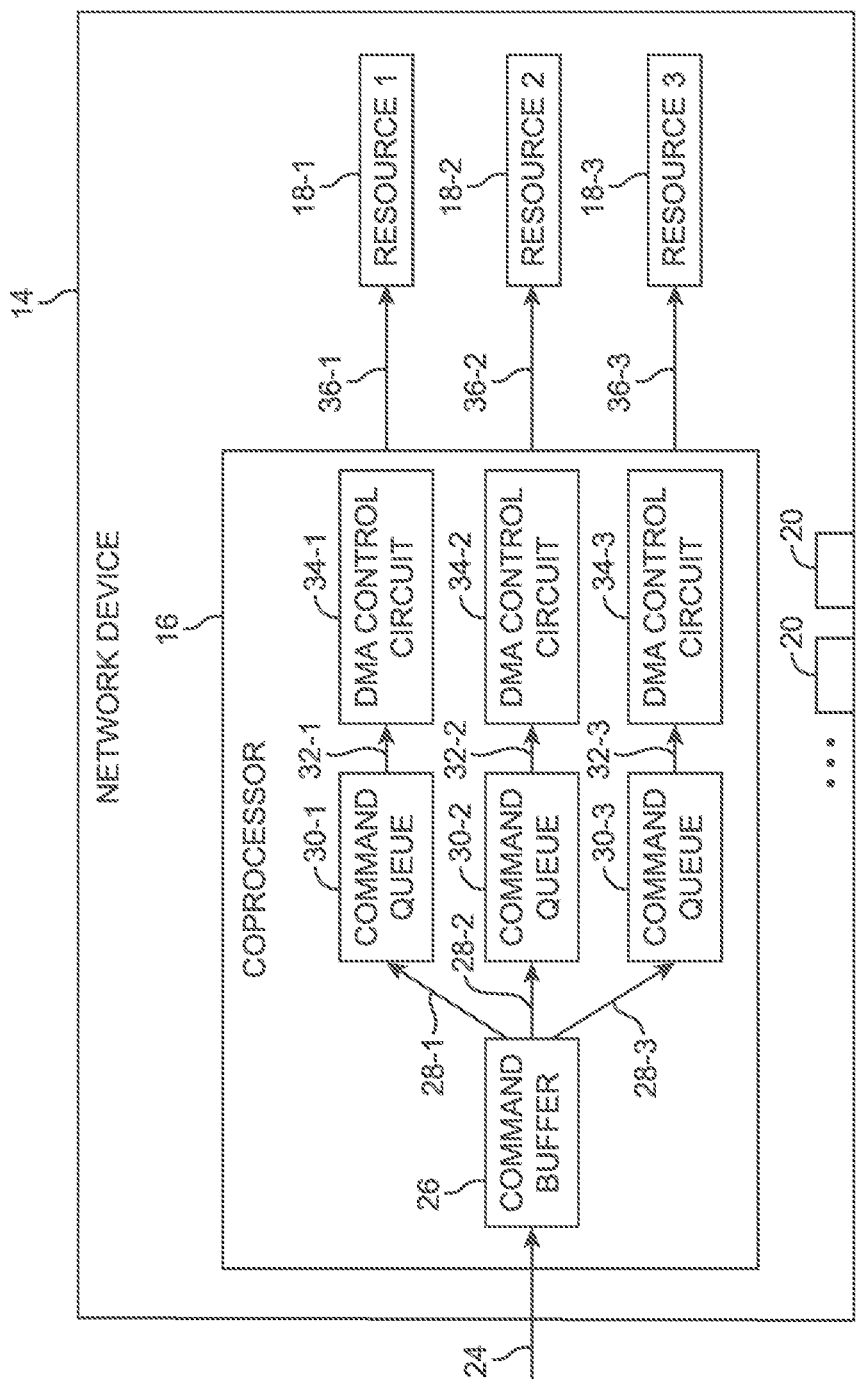
FIG. 4 is a diagram of an illustrative coprocessor having multiple command queues in accordance with some embodiments.

FIG. 4 is a diagram of an illustrative coprocessor having multiple parallel command processing pipelines. As shown in FIG. 4, command buffer 26 may receive and store commands via path 24 from host 12 (e.g., from a command storage structure 22' that aggregates commands or from a command storage structure 22-1 that stores only a set of commands from a set of host agents or processes). Coprocessor 16 may validate commands from command buffer 26 and distribute the validated commands via separate paths 28-1, 28-2, and 28-3 across multiple parallel command queues 30-1, 30-2, and 30-3.

Configurations in which the number of parallel command queues 30 corresponds to (e.g., is equal to) the number of target data storage resources 18 are sometimes described herein as an illustrative example. In the example of FIG. 4, coprocessor 16 may specifically queue commands with target destinations (e.g., tables or other data structures where data is to be written therein) on resource 18-1 onto command queue 30-1, may specifically queue commands with target destinations on resource 18-2 onto command queue 30-2, may specifically queue commands with target destinations on resource 18-3 onto command queue 30-3. Configured in this manner, command queues 30-1, 30-2, and 30-2 may sometimes be referred to therein as resource-specific command queues.

Each of the parallel command processing pipelines may include a resource-specific command queue 30 may be coupled to a corresponding DMA control circuit 34 via a respective path 32. A DMA control circuit 34 may receive dequeued commands from the command queue 30 in its command processing pipeline and may perform DMA operations based on the received commands via one or more DMA channels coupled to the resource 18 connected to the resource-specific pipeline.

In the example of FIG. 4, DMA control circuit 34-1 may perform DMA operations to write data onto data storage resource 18-1 using DMA channel 36-1 and, if desired and/or available, additional DMA channels (and corresponding DMA control circuits) coupled to data storage resource 18-1. DMA control circuit 34-2 may perform DMA operations to write data onto data storage resource 18-2 using DMA channel 36-2 and, if desired and/or available, additional DMA channels (and corresponding DMA control circuits) coupled to data storage resource 18-2. DMA control circuit 34-3 may perform DMA operations to write data onto data storage resource 18-3 using DMA channel 36-3 and, if desired and/or available, additional DMA channels (and corresponding DMA control circuits) coupled to data storage resource 18-3.

By providing or implementing resource-specific processing pipelines (e.g., resource-specific command queues 30-1, 30-2, 30-3, etc., respectively coupled to resource-specific DMA control circuits 34-1, 34-2, 34-3, etc.), coprocessor may process commands for different resources in parallel, thereby increasing command processing throughput.

More specifically, when one of command queues 30-1, 30-2, and 30-3 and/or DMA control circuit 34-1, 34-2, and 34-3 experiences a queuing delay and/or a delay in processing the command for performing the DMA operation, the delay is experienced by only one of the pipelines, thereby allowing the other pipelines to continue with DMA operations for the other two data storage resources.

On the other hand, when command queue 30 in one of the pipelines of coprocessor 16 is empty (e.g., no more data need to be written into the data storage resource 18 initially associated with the command queue 30 or pipeline), coprocessor 16 may flexibly use the components of that pipeline (e.g., the newly unused DMA control circuit(s) 34, the newly unused DMA channel(s) 36, etc.) for other pipelines (e.g., for other data storage resources).

If desired, performing the DMA operation (e.g., based on the dequeued commands) may be performed independent of the receipt of new commands via path 24 and validation and queuing of the new commands. In other words, command buffer 26 may not need to wait until the current batch of commands and their corresponding DMA operations have been completed before copying and receiving the next batch of commands via path 24. This may help further keep the command processing pipeline(s) full to minimize downtime.

Figure 5:
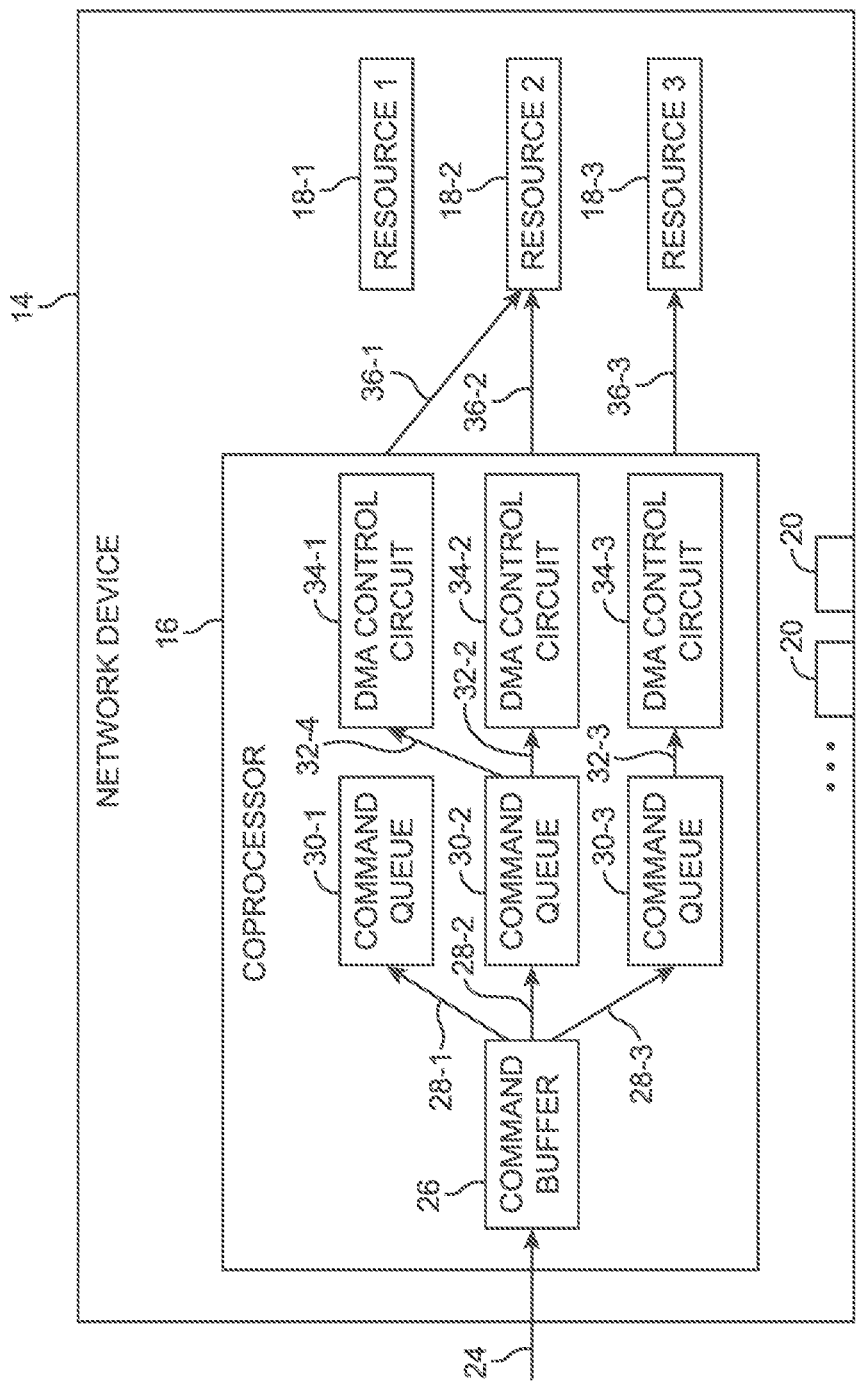
FIG. 5 is a diagram of an illustrative coprocessor such as the coprocessor of the type shown in FIG. 4 after a dynamic DMA channel reallocation operation in accordance with some embodiments.

While FIG. 4 shows a first state of coprocessor 16 and network device 14 when data is expected to be written into and/or being written into each of data storage resources 18-1, 18-2, and 18-3, FIG. 5 shows a second state of coprocessor 16 and network device 14 when no data is expected to be written into and/or is currently not being written into one of the data storage resources.

In the example of FIG. 5, command queue 30-1 may be empty. If unadjusted or not reconfigured, coprocessor 16 may then include one or more unused DMA control circuits such as DMA control circuit 34-1 and one or more corresponding unused DMA channels such as DMA channel 36-1. To efficient use the components on coprocessor 16 and network device 14, coprocessor 16 may reconfigure DMA control circuit 34-1 and DMA channel 36-1 (by adjusting the communications paths coupled thereto, by adjusting components such as switches between active and inactive states, by updating the target destination interface for the DMA channel, etc.) to operate with other pipelines and/or for data storage resources other than data storage resource 18-1.

In the re-configured state of network device 14 as shown in FIG. 5, command queue 30-2, which may be a resource-specific queue for data storage resource 18-2, may dequeue commands to DMA control circuit 34-1 in addition to dequeuing commands to DMA control circuit 34-2. Based on the received commands, DMA control circuits 34-1 and 34-2 may control respective DMA channels 36-1 and 36-2 to perform parallel DMA operations (e.g., with different destination interfaces at data storage resource 18-2) to write data from parallel commands to data storage resource 18-2.

As a first example, reconfiguration of coprocessor 16 and network device 14 as described above with respect to DMA control circuit 34-1 and DMA channel 36-1 may be responsive to command queue 30-1 being temporarily empty such as when the current batch of commands stored at command buffer 26 not including any commands to write data into data storage resource 18-1 but future commands in the same update (e.g., in the next batch of buffered commands) still target data storage resource 18-1. In this example, DMA control circuit 34-1 and DMA channel 36-1 may revert back to the state shown in FIG. 4 when processing additional commands (in the same update) that target data storage resource 18-1.

As a second example, reconfiguration of coprocessor 16 and network device 14 as described above with respect to DMA control circuit 34-1 and DMA channel 36-1 may be responsive to command queue 30-1 being expected to be empty for the reminder of the updating operation of network device 14. In this example, no reversion to the state shown in FIG. 4 is necessary.

While the dynamic adjustment of a single DMA control circuit and the DMA channel with which it is associated is described in connection with FIG. 5, this is merely illustrative. If desired, multiple DMA control circuits and DMA channels may be reconfigured at the same time and/or at different times.

In some illustrative arrangements, the dynamic adjustment of one or more DMA control circuits 34 and DMA channels 36 may not necessarily be based (solely) on a command queue being empty. The dynamic adjustment or reconfiguration of one or more DMA control circuits 34 and DMA channels 36 may generally be based on the amount of data being written into each resource (e.g., the distribution of data expected and/or observed to be written across the resources during the remainder of the update).

Using FIG. 4 as a starting point, consider an example where two DMA control circuits (e.g., DMA control circuit 34-1 and another DMA control circuit) controls two DMA channels (e.g., DMA channel 36-1 and another DMA channel) both with target destination interfaces at data storage resource 18-1. In other words, the initial allocation may be that two DMA channels are allocated to resource 18-1, one DMA channel is allocated to resource 18-2, and one DMA channel is allocated to resource 18-3 (similar to the DMA channel allocation shown in FIG. 1). This allocation may be based on the initial expectation of the most data being written into resource 18-1. However, sometime thereafter (e.g., after a suitable amount of data being written into resource 18-1 for the update), the majority of the remaining data to be written in the update may be destined for a different resource (e.g., resource 18-2). Accordingly, one of the two DMA channels may be reallocated from resource 18-1 and resource 18-2 (similar to the configuration of FIG. 5 if an DMA channel remained connected to resource 18-1).

The illustrative concepts described in connection with FIGS. 2-5 may be applied in any suitable combination. As a first example, network device 14 having coprocessor 16 with three parallel resource-specific pipelines (FIG. 4) may include multiple DMA control circuits and correspond DMA channels for one of the three resources (e.g., an excess DMA channel 36-4 coupled to data storage resource 18-1 as described in connection with FIG. 2). As second example, network 14 having coprocessor 16 with a single pipeline (FIG. 2) may dynamically re-allocate a DMA channel initially coupled to a data storage resource to another data storage resource (e.g., as described in connection with FIG. 5, although not responsive to a command queue being empty, but generally based on distribution of data expected to be written across the resources during the remainder of the update). These two examples are not intended to be limiting. Other combinations are also possible.

Figure 6:
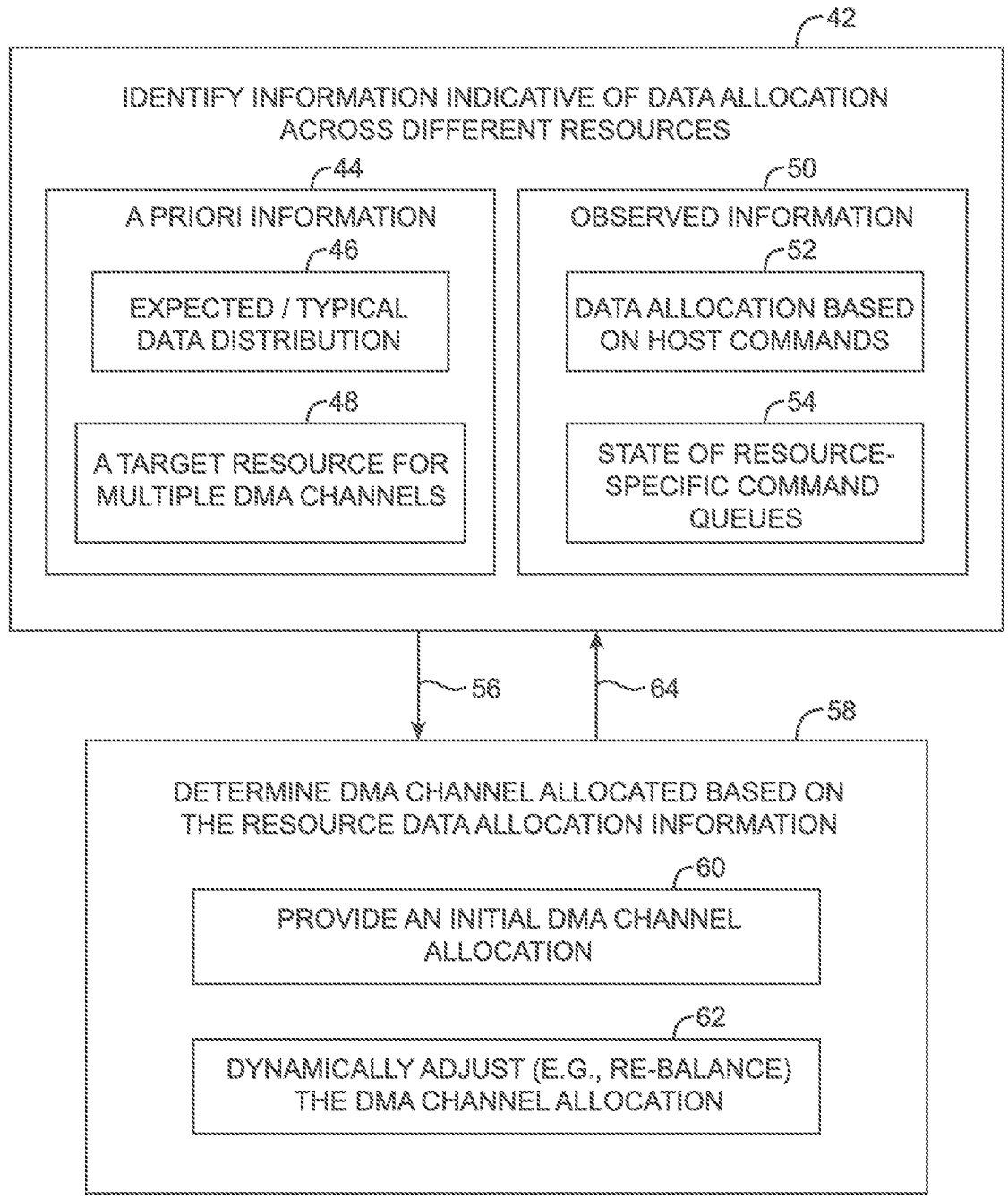
FIG. 6 is a flowchart of illustrative operations for allocating DMA channels in accordance with some embodiments.

FIG. 6 is a flowchart of illustrative operations for performing DMA channel allocation based on data allocation across different data storage resources. The operations described in connection with FIG. 6 may be performed at one or more components on host device or system 10 in FIG. 1 (e.g., host processor 12, coprocessor 16, memory used by host processor 12 and/or coprocessor 16, data storage resources 18, etc.). While some operations are described as being performed between components such as a coprocessor within a network device and components external to the network device such as a host processor on a host device to which the network device is coupled, these operations may be performed by components arranged in other manners (e.g., a host processor and a coprocessor on the same network device, generally a first processor and a second processor, etc.), if desired.

At block 42, network device 14 (e.g., coprocessor 16) and/or host device 10 (e.g., host processor 12) may identify information indicative of data allocation across different data storage resources. As described in connection with FIGS. 1-5 and reiterated here, these data storage resources (e.g., data storage resources 18) may refer to data structures such as tables, lists, arrays, buffers, queues, rings, etc. in which packet processing data useable in the packet processing pipelines are written into and stored. As examples, the packet processing data may include data for forwarding tables, VLAN membership tables, spanning tree membership tables, pattern matching tables, quality-of-service lookup tables, etc. Each data storage resource may include data structures for a particular portion of the packet processor (e.g., an ingress module, a memory management module, an egress module, etc.).

As part of block 42, network device 14 (e.g., coprocessor 16) and/or host device 10 (e.g., host processor 12) may identify one or more types of information such as the type of information in block 44 and/or the type of information in block 50.

At block 44, network device 14 (e.g., coprocessor 16) and/or host device 10 (e.g., host processor 12) may identify a priori information indicative of data allocation such as an expected or typical data distribution 46 between different data storage resources and/or an indication of a target data storage resource 48 to be targeted by multiple DMA channels. As an example, in scenarios where network device 14 contains a first data storage resource for the ingress module or pipeline and a second data storage resource for the egress module or pipeline, network device 14 (e.g., coprocessor 16) and/or host device 10 (e.g., host processor 12) may determine that more data will likely be stored on the first data storage resource than the second data storage resource because the ingress module typical performs more packet processing operations and therefore uses larger numbers of and/or sized tables. As another example, network device 14 (e.g., coprocessor 16) and/or host device 10 (e.g., host processor 12) may specifically receive (e.g., based on input from a network administrator) an indication of a target data storage resource to which large amounts of data are written (e.g., a resource targeted by multiple DMA channels).

At block 50, network device 14 (e.g., coprocessor 16) and/or host device 10 (e.g., host processor 12) may identify observed information indicative of data allocation such as a distribution of different types of host commands 52 indicating data allocation across the data storage resources and/or one or more states 54 of resource specific queues. As an example, host processor 12 may sample commands stored at one or more command storage structures 22 and/or 22' (FIG. 3) to determine how often and/or the amount of data to be stored into each data storage resource and may convey this information to coprocessor 16 as an indicator for the distribution of data across the different data storage resources. As another example, coprocessor 16 may sample commands stored at command buffer 26 (e.g., FIG. 2) to determine how often and/or the amount of data to be stored into each data storage resource and use this information as an indicator for the distribution of data across the different data storage resources. As yet another example, coprocessor 16 may look at states of its command queues to determine their activity levels and/or states (e.g., the depth of the queue such as the state of being full, empty, at half capacity, etc.) and use this information as an indicator for the distribution of data across the different data storage resources.

At block 58, network device 14 (e.g., coprocessor 16) may determine DMA channel allocation across the different data storage resources based on the information indicative of the data allocation across the different data storage resources. As examples, coprocessor 16 may allocate zero, one, or more than one DMA channels to each data storage resource. In particular, based on information that no data is being written into a data storage resource, coprocessor 16 may allocate zero DMA channels to the data storage resource. Based on information that a majority of data and/or an amount of data more than any other data storage resource is being written into a data storage resource, coprocessor may allocate more than one DMA channels (e.g., multiple parallel DMA channels up to a limit of available DMA channels) to the data storage resource. Coprocessor 16 may allocate one DMA channel per data storage resource as a default and may add additional parallel DMA channels to some data storage resources and remove the single data storage resource from some data storage resources as desired.

As part of block 58, network device 14 (e.g., coprocessor 16) may determine DMA channel allocation at different times or under different conditions such as the condition in block 60 and/or the condition in block 62.

At block 60, coprocessor 16 may provide an initial DMA channel allocation between the different data storage resources based on the information indicative of the distribution of data between the different data storage resources (e.g., the information identified and/or received at block 42).

At block 62, coprocessor 16 may dynamically update (e.g., adjust or re-balance) the DMA channel allocation between the different data storage resources based on new information indicative of a new distribution of data between the different data storage resources (e.g., new information identified and/or received at block 42).

In one illustrative sequence of operation, network device 14 (e.g., coprocessor 16) may identify and/or receive information indicating the distribution of data across the multiple data storage resources by performing the operations in block 42. Network device 14 (e.g., coprocessor 16) may proceed via path 56 to provide an initial DMA channel allocation and implement an initial arrangement of DMA channels (e.g., multiple DMA channels for some data storage resources) by performing the operations of block 60. Network device 14 (e.g., coprocessor 16) may then proceed via path 56 back to block 42 (e.g., a second iteration of the operations of block 42) and continue to monitor for additional (new) information based on which the initial DMA channel allocation may be adjusted. Responsive to this new information, network device 14 (e.g., coprocessor 16) may adjust (e.g., re-balance) DMA channels across the different data storage resources from the initial allocation to a new allocation by performing the operations of block 62. Based on the dynamics of the update to write network traffic processor data into the network device, network device 14 (e.g., coprocessor 16) may perform additional iterations of the operations of blocks 42 and 62 to dynamically optimize DMA channel allocation. In general, this type of dynamic adjustment may occur periodically with an update, may occur a set number of times within an update, may occur based on a trigger condition (e.g., the information indicating data distribution has changed across the data storage resources), may be omitted entirely, if desired.

The methods and operations described above in connection with FIGS. 1-6 may be performed by the components of a network device and/or system using software, firmware, and/or hardware (e.g., dedicated circuitry or hardware). Software code for performing these operations may be stored on non-transitory computer readable storage media (e.g., tangible computer readable storage media) stored on one or more of the components of the network device and/or system. The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of the network device and/or system (e.g., host processor 12 and/or coprocessor 16).

The foregoing is merely illustrative and various modifications can be made to the described embodiments. The foregoing embodiments may be implemented individually or in any combination.

What is claimed is:

1. A method of data storage resource access on a network device, the method comprising:
    receiving data allocation information on how network traffic processor data is distributed across a plurality of data storage resources in the network device;
    connecting a set of direct memory access channels to the plurality of data storage resources based on the received data allocation information, wherein a given data storage resource in the plurality of data storage resources is connected to multiple direct memory access channels in the set of direct memory access channels; and
    receiving host commands for accessing the plurality of data storage resources using the set of direct memory access channels, wherein the data allocation information on how the network traffic processor data is distributed across the plurality of data storage resources comprises:
        expected data allocation information indicative of an expected data distribution across the plurality of data storage resources, or
        types of the received host commands.

2. The method defined in claim 1 further comprising:
    adjusting the set of direct memory access channels by changing a connection of a direct memory access channel in the set of the direct memory access channels from a first data storage resource in the plurality of data storage resources to a second data storage resource in the plurality of data storage resources.

3. The method defined in claim 2 further comprising:
    receiving new data allocation information on how the network traffic processor data is distributed across the plurality of data storage resources, wherein adjusting the set of direct memory access channels is based on the new data allocation information.

4. The method defined in claim 1 further comprising:
    queuing the host commands along a command processing pipeline, wherein the host commands target each data storage resource in the plurality of data storage resources.

5. The method defined in claim 1 further comprising:
    queuing the host commands across multiple parallel command queues, wherein the host commands target each data storage resource in the plurality of data storage resources.

6. The method defined in claim 5 further comprising:
    buffering the host commands; and
    distributing the buffered host commands across the multiple parallel command queues based on target destination interfaces of the buffered host commands.

7. The method defined in claim 6, wherein buffering the host commands comprises receiving, from a command storage structure, aggregated host commands from multiple other command storage structures.

8. The method defined in claim 5 further comprising:
    determining a state of a given command queue in the multiple parallel command queues; and
    adjusting the set of direct memory access channels by changing a connection of a direct memory access channel in the set of the direct memory access channels from a first data storage resource in the plurality of data storage resources to a second data storage resource in the plurality of data storage resources based on the determined state of the given command queue.

9. The method defined in claim 8, wherein the state of the given command queue is empty.

10. The method defined in claim 1, wherein the network traffic processor data comprises first network traffic processor data for an ingress traffic module and wherein the given data storage resource is configured to store the first network traffic processor data and includes a plurality of data structures configured to store different portions of the first network traffic processor data.

11. The method defined in claim 10, wherein a first of the multiple direct memory access channels is coupled to a first data structure in the plurality of data structures and a second of the multiple direct memory access channels is coupled to a second data structure in the plurality of data structures.

12. The method defined in claim 10, wherein the network traffic processor data comprises second network traffic processor data for an egress traffic module and third network traffic processor data for a memory management module and wherein the plurality of data storage resources comprise a second data storage resource configured to store the second network traffic processor data and a third data storage resource configured to store the third network traffic processor data.

13. The method defined in claim 10, wherein the plurality of data structures are configured to store at least one of traffic forwarding data, virtual local area network membership data, spanning tree membership data, pattern matching data, or quality-of-service data.

14. A network device comprising:
    processing circuitry having a command buffer that receives and buffers commands and having first and second parallel command queues each coupled to the command buffer, wherein the command buffer is in a host processor and wherein the first and second command queues are in a coprocessor;

a first data storage resource having a first plurality of data structures configured to store a first portion of network traffic processor data usable to process network traffic received by the network device;

a second data storage resource having a second plurality of data structures configured to store a second portion of the network traffic processor data usable to process the network traffic received by the network device, wherein the command buffer distributes a first portion of the buffered commands to the first command queue based on the first portion of the buffered commands targeting the first plurality of data structures and wherein the command buffer distributes a second portion of the buffered commands to the second command queue based on the second portion of the buffered commands targeting the second plurality of data structures; and a set of direct memory access channels, wherein the processing circuitry performs the first and second distributed portions of the buffered commands by writing the first and second portions of the network traffic processor data into the first and second data storage resources, respectively, using the set of direct memory access channels.

15. The network device defined in claim 14, wherein a number of command queues in the coprocessor is equal to a number of data storage resources accessible by the command queues of the coprocessor.

16. The network device defined in claim 14, wherein the coprocessor comprises a third command queue coupled to the command buffer and configured to receive a third portion of the buffered commands.

17. A host system comprising:

a host processor that includes a set of command storage structures each storing commands for a corresponding host process executing on the host processor, and a command coalescing storage structure that receives and aggregates the commands from each command storage structure in the set of command storage structures;

a coprocessor having a command buffer that receives the aggregated commands from the command coalescing storage structure of the host processor; and a plurality of data storage resources, wherein the coprocessor performs the aggregated commands by writing network traffic processor data into the plurality of data storage resources using direct memory access channels, wherein a corresponding path in the host processor couples the command coalescing storage structure of the host processor to each command storage structure in the set of command storage structures of the host processor and wherein an additional path couples the command coalescing storage structure of the host processor to the command buffer of the coprocessor.

18. The host system defined in claim 17, wherein the coprocessor includes multiple parallel command processing pipelines and wherein the aggregated commands are distributed across the multiple parallel command processing pipelines based on target interfaces of the aggregated commands.

* * * * *